United States Patent [19]
Dillon et al.

[11] 4,266,624
[45] May 12, 1981

[54] WEIGHING APPARATUS

[75] Inventors: Benny N. Dillon, Worthington; William C. Susor, Westerville, both of Ohio

[73] Assignee: Masstron Scale, Inc., Columbus, Ohio

[21] Appl. No.: 57,491

[22] Filed: Jul. 13, 1979

[51] Int. Cl.³ .................... G01G 21/22; G01G 19/02
[52] U.S. Cl. .................................. 177/253; 177/128; 177/134
[58] Field of Search ................ 177/128, 134, 211, 253

[56] References Cited

U.S. PATENT DOCUMENTS

| | | | |
|---|---|---|---|
| 2,962,275 | 11/1960 | Thurston | 177/255 X |
| 3,447,618 | 6/1969 | Murphy | 177/126 |
| 3,935,913 | 2/1976 | Wagner et al. | 177/134 |
| 3,966,001 | 6/1976 | Goldberg | 177/253 X |

FOREIGN PATENT DOCUMENTS 1214428  4/1966  Fed. Rep. of Germany ........... 177/128

OTHER PUBLICATIONS

Dudley/Conley Heavy Duty Industrial Scales–Bulletin D–201, Published 12/77 by Martin–Decker Co., 1928 S. Grand Ave., Santa Ana, CA 92705.

*Primary Examiner*—George H. Miller, Jr.

[57] ABSTRACT

An improved weighing apparatus includes a plurality of platforms disposed in a linear array. Each of the platforms has a pair of longitudinally extending support sections located adjacent to opposite edges of the platform. A plurality of beams and a deck plate extend between the support sections to provide a rigid platform which can withstand relatively heavy loads without excessive deflection. Cantilevered support arms project outwardly from the support sections of one of the platforms into the support sections of the next adjacent platform to partially support the next adjacent platform. The support arms have free end portions which are loaded by the next platform. A load responsive unit is associated with each of the support arms. Each load responsive unit includes a cantilevered load arm having a fixed end portion which is connected with a fixed end portion of a support arm and a free end portion which is deflectable toward the support arm under the influence of a load. The load is transmitted from the free end portion of the load arm to a support surface by a base which extends through an opening in a bottom wall of a support section.

18 Claims, 10 Drawing Figures

WEIGHING APPARATUS

BACKGROUND OF THE INVENTION

This invention relates to a new and improved weighing apparatus and more specifically to a weighing apparatus which includes a platform to receive a load to be weighed.

A known weighing apparatus is disclosed in U.S. Pat. No. 2,962,275. This weighing apparatus includes a massive platform assembly having a plurality of sections which are bolted together. The center section of the platform assembly is supported by four load cells. The two outer sections of the platform assembly are supported by the center section and by pairs of load cells. Each of the platform sections of this known weighing apparatus is formed by a plurality of relatively heavy and expensive side beams which are interconnected by a plurality of somewhat lighter cross beams and by heavy planks.

Another known weighing apparatus is disclosed in U.S. Pat. No. 3,935,913 and includes a platform which is formed by a top deck or plate. The top plate is reinforced by angle irons and a bottom plate. Exposed load cells are mounted at each of the corners of the top plate.

A known weighing apparatus is also illustrated in U.S. Pat. No. 3,447,618. This weighing apparatus includes a plurality of platform sections. Each of the platform sections has a relatively heavy I beam construction. One platform section can be connected with an adjacent platform section by means of pads which are disposed in abutting engagement with each other.

Still another known weighing apparatus includes very heavy beams which are bolted together to form a pair of weigh bridge sections. Load receiving deck sections are placed between the weigh bridge. A load is transmitted from the deck sections to the weigh bridge sections. Suitable weighing devices are used with the weigh bridge sections to provide an output which varies as a function of a load on the apparatus.

SUMMARY OF THE PRESENT INVENTION

The present invention provides a new and improved weighing apparatus having relatively compact load receiving platforms which are strong, light weight and inexpensive to fabricate. The weighing apparatus is formed by separate platforms so that the apparatus can be readily assembled at a weighing site. In addition, the apparatus can be readily disassembled and transported to another weighing site if desired. Also, additional sections can be added to the apparatus.

Each platform includes a pair of box suppport sections which are disposed along longitudinally extending edge portions of the platform. The box support sections are interconnected by a plurality of cross beams. A deck plate forms the upper portion of the box support section and spans the space between the support sections and the cross beams. Load responsive weighing units are disposed within the support sections where they are protected from the surrounding environment.

In accordance with one of the features of the present invention, a plurality of platforms are interconnected to transmit a load between them in such a manner as to minimize the number of load responsive weighing units which are required for the platforms. Thus, a pair of spaced apart support arms project outwardly from the support sections of one platform into the support sections of a next adjacent platform to partially support the next adjacent platform. In addition to partially supporting the next adjacent platform, the support arms hold the adjacent platform against excessive sidewise movement.

In order to promote an accurate reading by a load responsive weighing unit which is associated with a support arm, the weighing unit is disposed directly beneath and in vertical alignment with the support arm. The weighing unit is disposed below the support arm and engages a base arrangement which transmits a load through an opening in the bottom wall of a support section to a suitable support surface for the weighing unit. This mounting arrangement for the weighing unit tends to minimize the application of torsion loading to the weighing unit and enables the unit to be protected from the surrounding environment by the support section of a platform.

Accordingly, it is an object of this invention to provide a new and improved weighing apparatus having a platform with box support sections which extend throughout the length of the platform and in which load responsive weighing units are located.

Another object of this invention is to provide a new and improved weighing apparatus which includes a plurality of platforms with support arms extending from box support sections of one of the platforms into box support sections of a next adjacent platform to at least partially support the next adjacent platform.

Another object of this invention is to provide a new and improved weighing apparatus which includes a plurality of platforms with load support arms extending between the platforms and wherein a load arm of a weighing unit has an end portion which is fixedly connected with one of the support arms and a free end portion which deflects upon application of a load to the load arm.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT

Figure 1:
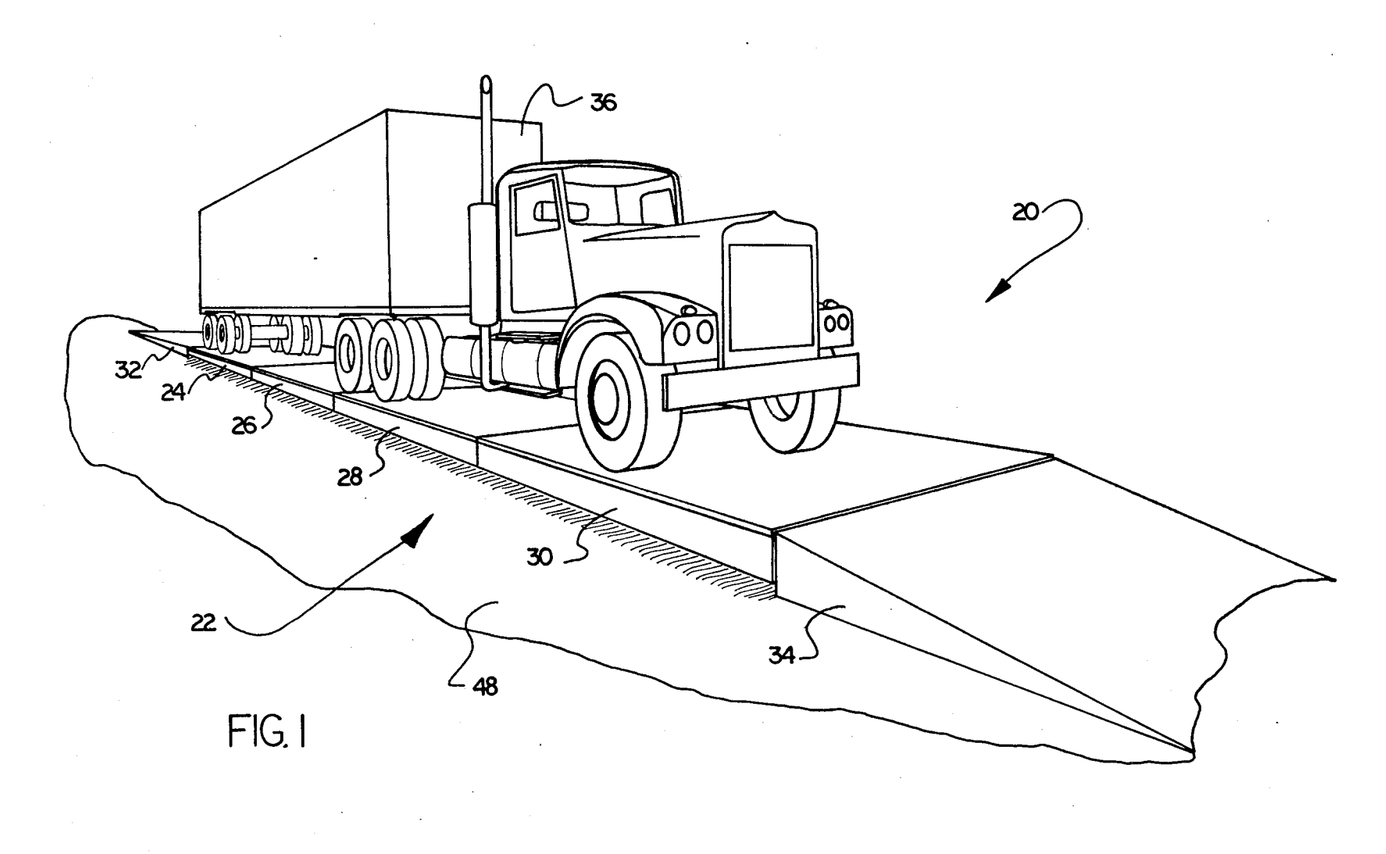
FIG. 1 is a pictorial illustration of a weighing apparatus constructed in accordance with the present invention.

A weighing apparatus 20 (FIG. 1) includes a platform assembly 22 having a plurality of longitudinally extending platforms 24, 26, 28 and 30 which are constructed in accordance with the present invention. The platforms 24–30 are disposed in a linear array between an entrance ramp 32 and an exit ramp 34. The ramps 32 and 34 enable a vehicle 36 to be driven onto and off from the platform assembly 22.

The platforms 24–30 are relatively light so that the weighing apparatus 20 can readily be assembled at a weighing site. In addition, the platforms 24–30 are relatively strong to enable the weighing apparatus 20 to withstand the repeated application of heavy loads. To provide the platforms 24–30 with a relatively light and strong construction, each of the platforms is provided with a pair of longitudinally extending box support sections 38 and 40 (see FIG. 2). The support sections 38 and 40 are disposed along opposite longitudinal edges of the platforms 24–30 and extend parallel to each other throughout the length of the platforms.

Figure 2:
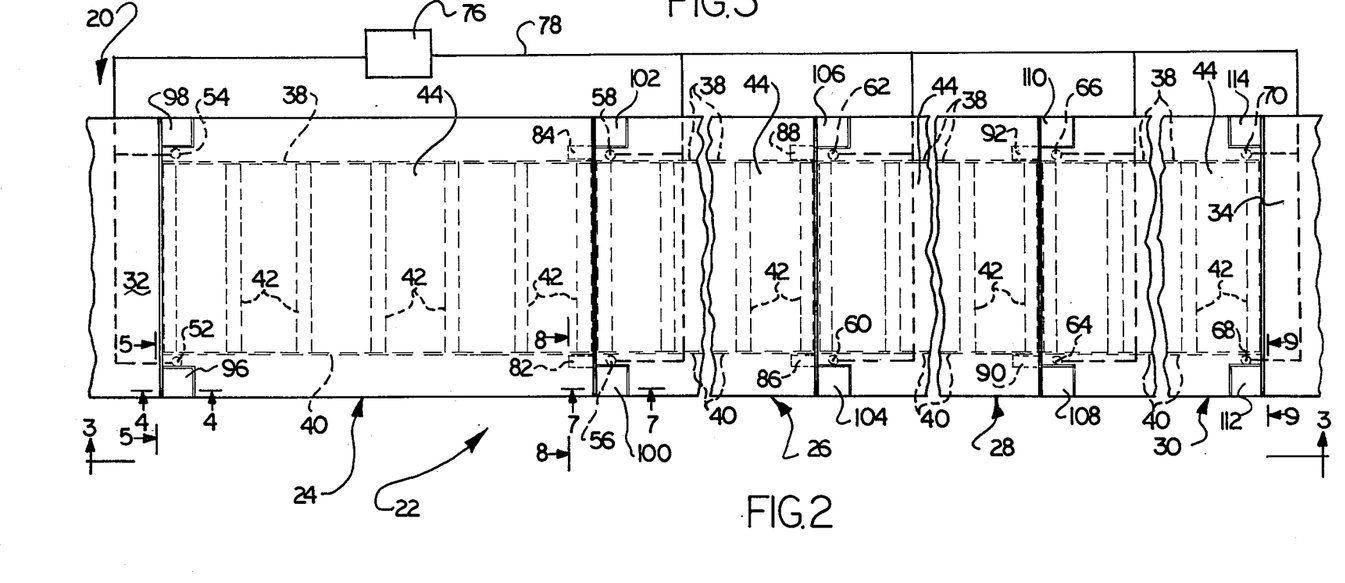
FIG. 2 is a plan view of a platform assembly used in the weighing apparatus of FIG. 1.

The support sections 38 and 40 are interconnected by a plurality of cross beams 42. The cross beams 42 have central axes which extend perpendicular to the central axes of the support sections 38 and 40 and to the central axis of the linear array of platforms 24–30. A deck plate 44 extends over the top of the cross beams 42 and forms the top wall of the support sections 38 and 40.

Figure 3:
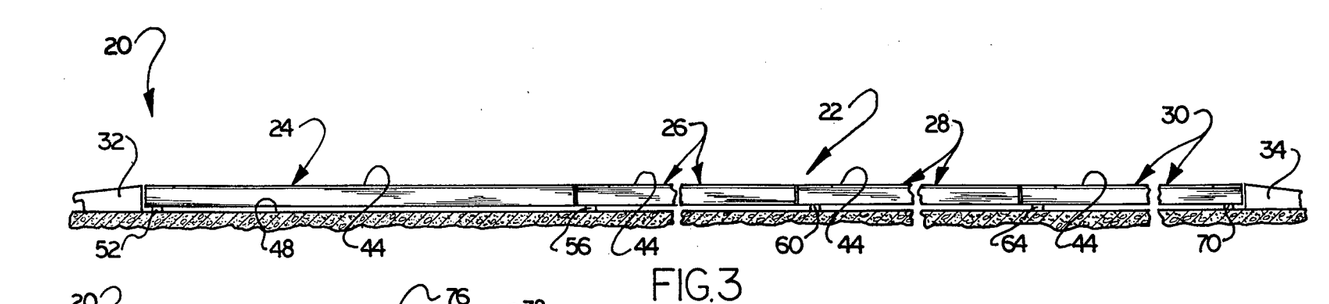
FIG. 3 is an elevational view, taken generally along the line 3—3 of FIG. 2 further illustrating the construction of the platform assembly.

This construction of the platforms 24–30 enables one specific embodiment of the invention to have an overall height of approximately eleven inches above a floor or support surface 48 (see FIG. 3). It should be understood that the overall height of the platforms 24–30 will vary from the foregoing height depending upon the magnitude of the loads which the platforms will carry and that the foregoing specific height was merely set forth for purposes of illustration rather than limitation. However, the platforms having the eleven inch overall height are utilized to weigh fully loaded large trucks, such as the one shown in FIG. 1.

The weighing apparatus 22 includes a plurality of load responsive weighing units 52, 54, 56, 58, 60, 62, 64, 66, 68 and 70 which are associated with the various weighing platforms 24–30 (see FIG. 2). The weighing units may be of any conventional construction and are connected with a common display or electronic print-out 76 by suitable electrical circuitry indicated at 78.

In order to minimize the number of weighing units 52–70 which are required to support the plaforms 24–30, the platforms 26, 28 and 30 are provided with outwardly projecting support arms 82, 84, 86, 88, 90 and 92. The projecting support arms 82–92 extend outwardly from one of the platforms 26–30 and support an end portion of a next adjacent platform. Thus, the support arms 82 and 84 project outwardly from the support sections 38 and 40 of the platform 26 (see FIG. 2) into the support sections for the platform 24 to support one end of the platform 24. The opposite end of the platform 24 is supported by the weighing units 52 and 54.

Similarly, the support arms 86 and 88 project from the platform 28 to support one end portion of the platform 26. The opposite end of the platform 26 is supported by the weighing units 56 and 58. Also, the support arms 90 and 92 extend outwardly from the platform 30 to support one end of the platform 28. The opposite end of the platform 28 is supported by the weighing units 60 and 62.

The platform 30 is disposed adjacent to the exit ramp 34 which is not provided with support arms. Therefore, the platform 30 is supported by four weighing units 64, 66, 68 and 70 at the corners of the platform.

In order to protect the weighing unis 52–70 and the support arms 82–92, they are disposed within the support sections 38 and 40 of the associated platforms 24–30. Although this mounting arrangement tends to minimize the amount of maintenance which is required by the weighing units 52–70, it is contemplated that it will be necessary to have access to the weighing units for installation and maintenance purposes. Therefore, removable closures or hatches 96, 98, 100, 102, 104, 106, 108, 110, 112 and 114 are provided in the platforms 24–30 to provide access to the weighing units.

It is contemplated that as the weighing apparatus 22 is utilized for an extended period of time, the platforms 24–30 will be exposed to substantial temperature variations which will cause thermal expansion and contraction of the platforms. In addition, it is contemplated that limited relative movement will occur between the platforms as vehicles are driven onto and off from the weighing apparatus 20.

In order to accommodate thermal effects and limited relative movement between the platforms, only one of the weighing units for each of the platforms 24–30 is located in a fixed position relative to the support surface 48. Thus, the weighing unit 52 for the platform 24 is fixedly connected with the support surface 48. The weighing unit 54 is movable through a limited distance relative to the support surface 48. In addition, a limited amount of sliding movement can occur between the support arms 82 and 84 and the platform 24. Similarly, only the weighing units 56, 60 and 64 for the platforms 26, 28 and 30 are fixedly connected with the floor or support surface 48. The other weighing units associated with these plaforms are movable through limited distances relative to the support surface 48. In addition, the platforms 26 and 28 are movable through limited distances relative to the support arms 86, 88, 90 and 92.

Although the platforms 24–30 are movable to accommodate thermal effects and various load forces, the extent of this movement is limited. Thus, the support arms 82–92 cooperate with the inner sidewalls of the support sections 38 and 40 to limit sidewise movement of the platforms 24–30 relative to each other. Sidewise movement of the platform 30 is also limited by utilizing bumper blocks in association with the weighing units 68 and 70. Of course, the fixedly mounted weighing units 52, 56, 60 and 64 provide fixed references from which any relative movement between the platforms 24–30 must occur.

Figure 4:
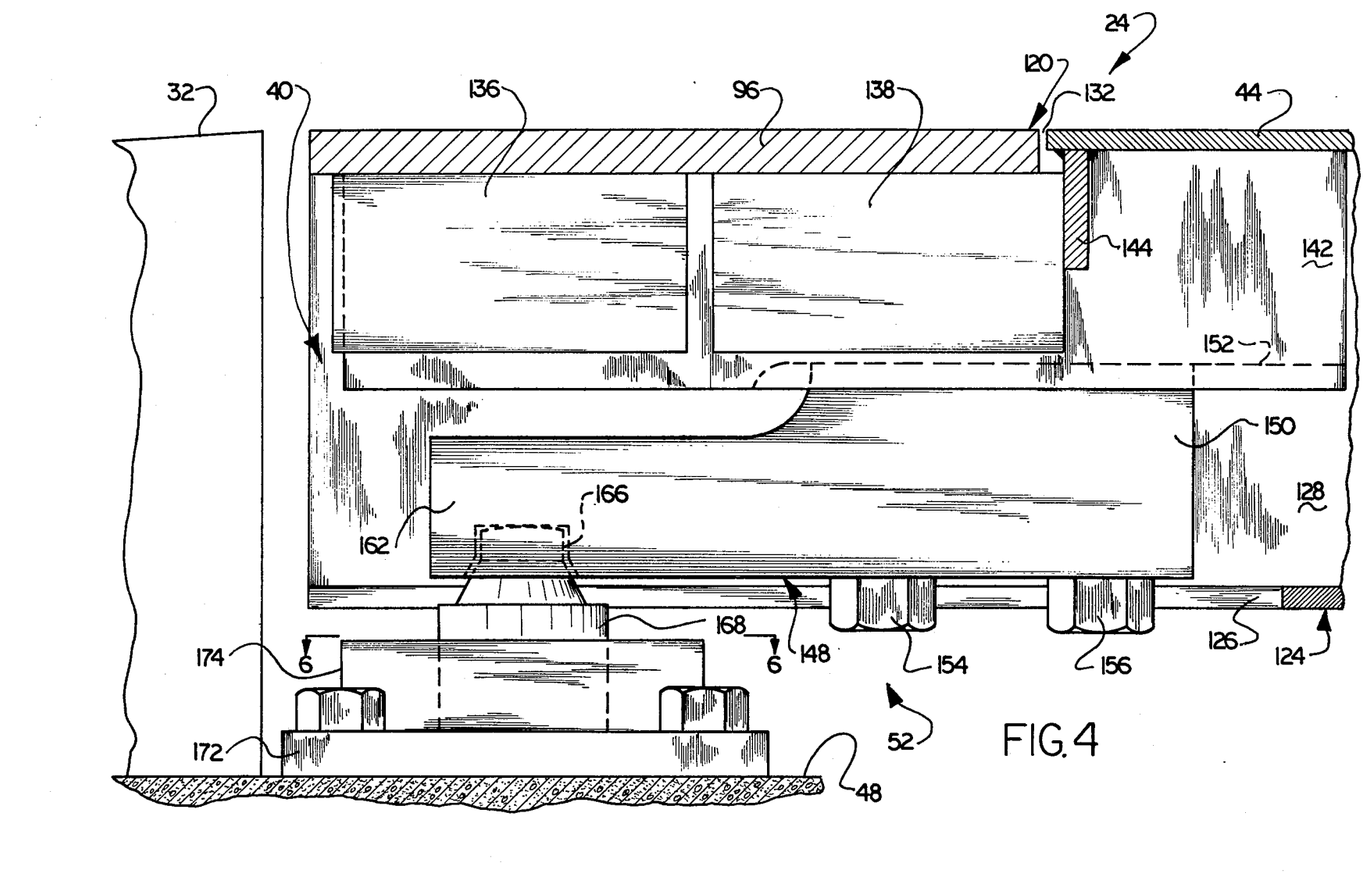
FIG. 4 is an enlarged fragmentary sectional view, taken generally along the line 4—4 of FIG. 2, illustrating the manner in which an end portion of one platform is supported by a load responsive weighing unit.
Figure 5:
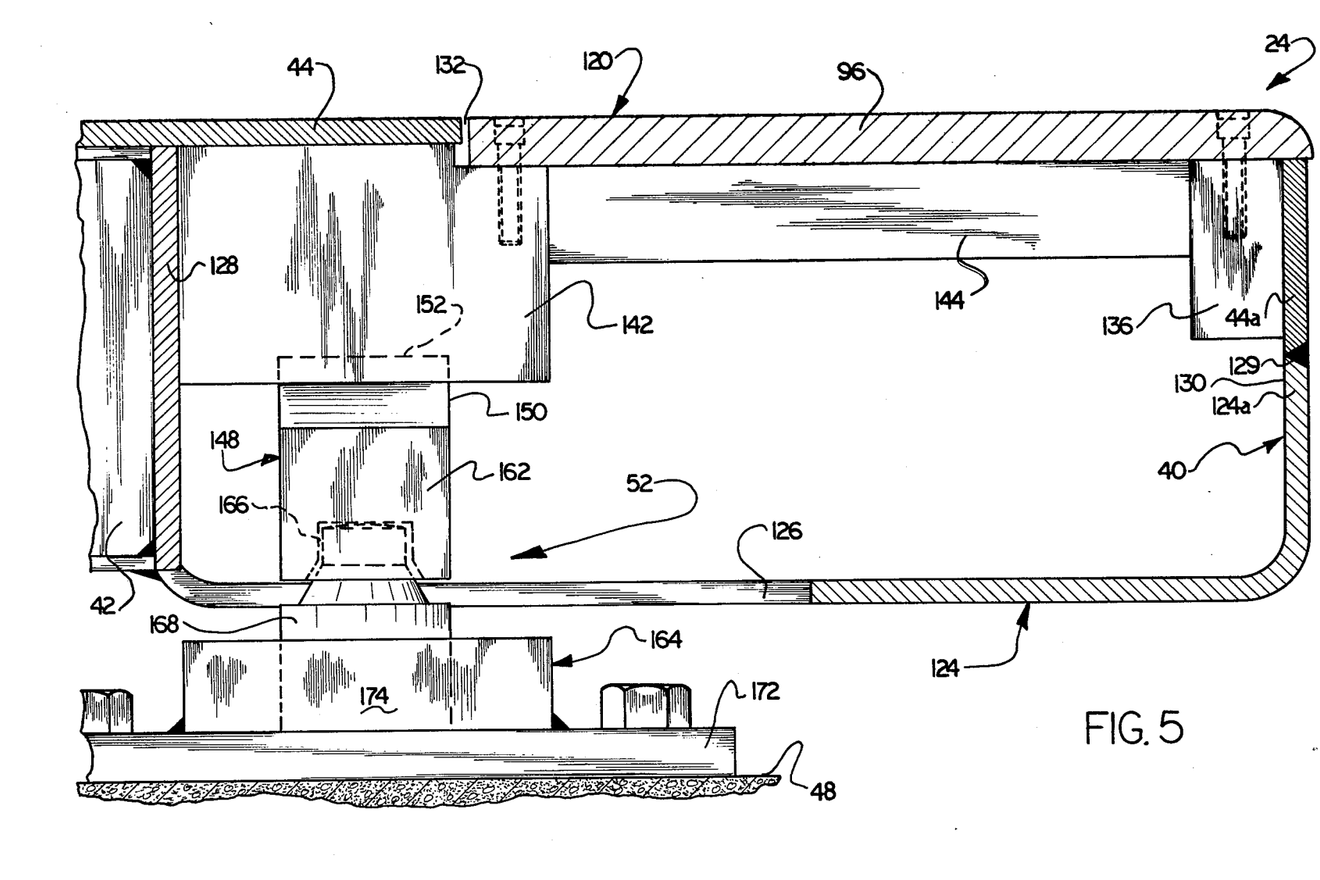
FIG. 5 is an elevational view, taken on an enlarged scale along the line 5—5 of FIG. 2, further illustrating the construction of the load responsive weighing unit cf FIG. 4 and the construction of a support section of the platform.
Figure 6:
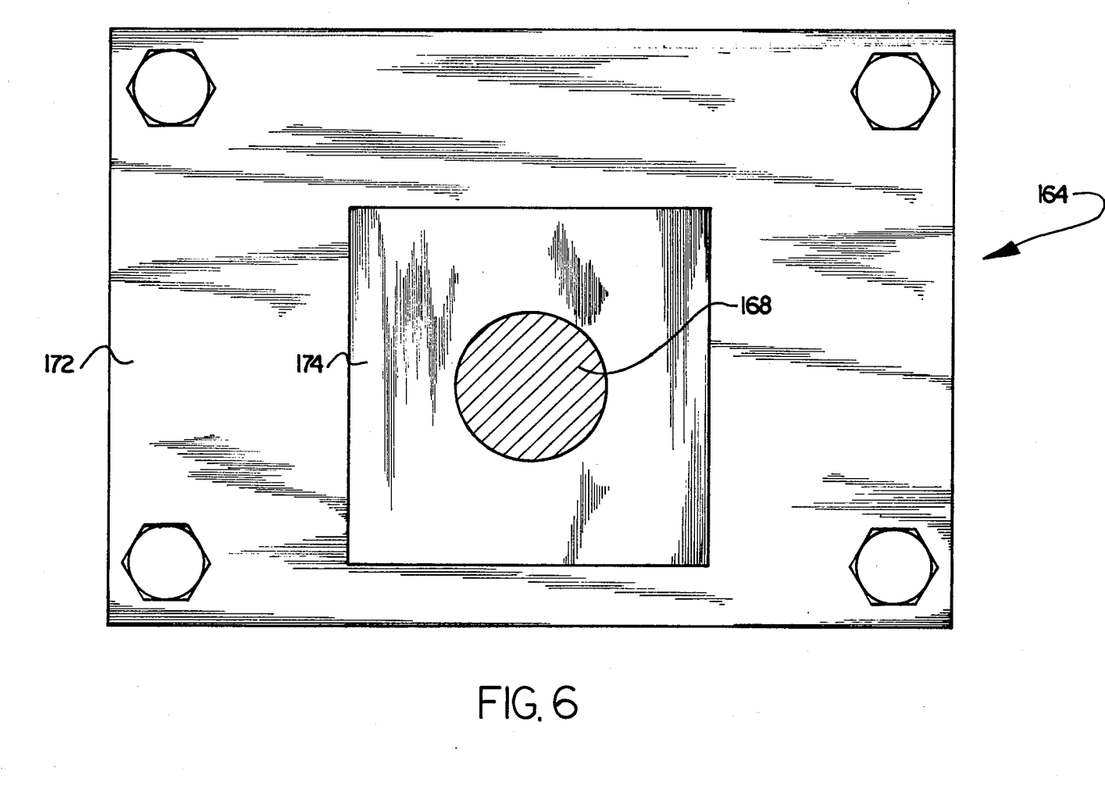
FIG. 6 is a sectional view, taken generally along the line 6—6 of FIG. 4, illustrating the construction of a base which is effective to hold a load pin of a weighing unit against sidewise movement.

The construction of the platforms 24–30 and their relationship to each other and to the weighing units 52–70 is more fully illustrated in FIGS. 4–10. More specifically, the relationship between the box support section 40 of the platform 24 and the load responsive weighing unit 52 is shown in FIGS. 4 and 5.

The box support section 40 extends for the entire length of the platform 24 and includes a top wall 120 having flat upper surface which is formed by the deck plate 44 and the cover 96 (FIGS. 4 and 5). A bottom wall 124 extends parallel to the top wall 120 and has a rectangular opening 126 through which a load pin 168 associated with the weighing unit 52 extends. The rectangular cross sectional configuration of the support section 40 is completed by parallel inner and outer sidewalls 128 and 130 (FIG. 5) which interconnect the top and bottom walls 120 and 124.

The outer sidewall 130 of each box section is formed by a downwardly projecting flange portion 44a of the deck plate 44 and an upwardly projecting flange portion 124a of a U-shaped plate which forms the inner wall 128 and the bottom wall 124. The flange portions 44a and 124a are welded together at 129. The weld 129 is located at the neutral bending axis of the support section 40, i.e., a location where minimum forces are acting to break the weld. More specifically, when a truck's weight is applied to the deck plate 44, the deck plate is placed in compression. The bottom wall 124 is placed in tension. These forces act on the weld 129. However, due to the location of the weld, these forces acting on the weld are minimized.

The rectangular cross sectional configuration of the support section 40 provides it with a relatively high moment of inertia and flexural rigidity. This enables the light platform 24 to withstand heavy loads without excessive deflection. The strength of the support section 40 is enhanced by the cross beams 42 which are fixedly connected at their ends to the inner sidewall 128. This reinforces the inner sidewall 128.

In order to further increase the load carrying capabilities of the platform 24, the weighing unit 52 is disposed immediately adjacent to the inner sidewall 128 (FIG. 5). By locating the weighing units 52 and 54 (see FIG. 2) adjacent to the inner sidewalls of the support sections 38 and 40, the distance between the two weighing units tends to be minimized. This tends to minimize the transverse bending moment to which the platform 24 is subjected.

It is contemplated that the distance between the support sections 38 and 40 and the weighing units 52 and 54 will vary depending upon the environment in which the weighing apparatus 20 is to be used. However, in one specific instance, the distance between the weighing units 52 and 54 approximated the distance between the front wheels of the type of truck to be weighed on the apparatus 20. This further minimizes the transverse bending moment applied to the platform 24.

The closure plate 96 (FIGS. 2, 4 and 5) covers an opening 132 (FIGS. 4 and 5) in the top wall 120. The opening 132, like the opening 126 in the bottom wall 124, extends longitudinally inwardly from the end of the platform 24. Thus, the rectangular openings 126 and 132 extend inwardly from one end of the platform 24 in the direction away from the entrance ramp 32 (see FIG. 4).

The opening 126 in the bottom wall 124 extends transversely outwardly from the inner sidewall 128 toward the outer sidewall 130 for a distance sufficient to enable the weighing apparatus 52 to be readily installed in association of the platform 24 (see FIG. 5). In order to maximize the strength of the innerconnection between the weighing apparatus 52 and the platform 24, the upper opening 132 does not extend directly over the weighing apparatus and is located to the outside of the weighing apparatus. Thus, the opening 132 extends transversely inwardly from the outer sidewall 130 toward the inner sidewall 128 (see FIG. 5). Although the two openings 126 and 132 extend transversely from the opposite sidewalls 128 and 130 they do overlap each other to provide easy access to the lower portion of the weighing apparatus 52 through the upper opening 132.

During use of the weighing apparatus 20, the closure plate 96 may be subjected to relatively high loads due to movement of vehicles across the closure plate. Therefore, the closure plate 96 is firmly supported by the support section 40. To this end, a pair of support blocks 136 and 138 (see FIG. 4) are fixedly connected with the outer sidewall 130 (see FIG. 5). The support blocks 136 and 138 provide a solid support for the outer end portion of the closure plate 96. The inner end portion of the closure plate 96 is firmly supported by a relatively large inner support block 142 which also supports the weighing apparatus 52.

The upper deck or plate 44 is reinforced by a rib 144 (FIGS. 4 and 5) at the inner end of the opening 132. Other reinforcing ribs could also be used which fill the cross section of the box section. However, since the bottom wall 124 of the support section 40 is not subjected to relatively high direct loads during use of the weighing apparatus 20, it is not necessary to reinforce the bottom wall 124.

The weighing unit 52 is associated with a load pin 168 which extends through the opening 126 in the bottom wall 124 and the weighing unit 52 and pin 168 are located between the support surface 48 and the rectangular support block 142 (FIG. 4). The weighing apparatus 52 includes a cantilevered load arm 148 having a fixed end portion 150 which extends into a slot 152 formed in the support block 142 and is fixedly connected with the support block by bolts 154 and 156. A free end portion 162 of the horizontal load arm 148 engages the pin 168 forming a part of a base assembly 164.

When a load is applied to the platform 24, at least a portion of the load is transferred from the platform 24 through the load arm 148 to the base assembly 164 and support surface 48. This results in the load arm 148 being subjected both shear stresses and bending stresses. Strain gauge tranducers (not shown) are mounted on the load arm 148 in a known manner and are capable of measuring either bending strain or shear strain in the load arm to provide an output which varies as a function of variations in the load transmitted to the base assembly through the load arm 148. These strain gauges are connected with the display apparatus 76 by the electrical circuitry 78 (FIG. 2).

The free end portion 162 (FIG. 4) of the load arm 148 is provided with a recess 166 which receives an end portion of the load pin 168. The load pin 168 has a circular bottom surface which abuts the top surface of a plate 172 (FIGS. 4, 5 and 6) which is fixedly connected with the support surface 48. The load is thus transmitted through the pin 168 to plate 172 and to a suitable support surface 48 for the plate 172. A retaining block 174 (FIG. 6) is fixedly connected with the base plate 172 and has a cylindrical opening which receives the lower portion of the pin 168 to hold the pin against movement relative to the base plate 172 and support surface 48.

Since the load pin 168 is fixed relative to the support surface 48, the lower left corner of the platform 24 (as viewed in FIG. 2) is connected to the support surface by a pivot connection at the weighing unit 52.

In order to accommodate thermal expansion of the platform 24 and other effects, the weighing unit 54 at the upper left corner of the platform 24 (as viewed in FIG. 2) has a floating mounting which is free to move relative to the support surface 48. Although the weighing unit 54 is free to shift relative to the support surface 48, the support arms 82 and 84 from the platform 26 extend into the support sections 38 and 40 of the platform 24 and cooperate with the sidewalls of the support sections to limit the sidewise movement of the platform 24.

Although the construction of only the support section 40 has been illustrated in FIGS. 4 and 5, it should be understood that the support section 38 has the same construction as the support section 40 and extends throughout the full length of the platform 24. In addition, it should be understood that the position of the weighing unit 54 relative to the support section 38 is the same as the position of the weighing unit 52 relative to the support section 40. Thus, the weighing unit 54 is disposed adjacent to the inner sidewall of the support section 38 in the same manner as in which the weighing unit 52 is disposed adjacent to the inner sidewall 128 of the support section 40.

The weighing unit 56 (see FIGS. 2, 7 and 8) cooperates with the platform 26 in the same manner as in which the weighing unit 52 cooperates with the platform 24. In addition, the construction of the weighing unit 56 is the same as the construction of the weighing unit 52. Therefore, numerals similar to those used in association with the weighing unit 52 will be utilized to designate similar components of the weighing unit 56, the suffix letter "a" being added to the numerals designating components of the weighing unit 56 in order to avoid confusion.

A weighing unit 56 includes a cantilevered load arm 148a (FIG. 7) having a fixed end portion 150a and a free end portion 162a. A base assembly 164a extends through an opening 126a in a bottom wall 124a of the support section 40 for the platform 26. The base assembly 164a includes a load pin 168a which is received in a recess 166a formed in the free end portion 162a of the load arm 148a. The load pin 168a abuttingly engages a base plate 172a which is held against movement relative to the support surface 48. The support pin 168a is held against movement relative to the base plate 172a and the support surface 48 by a retainer block 174a which is fixedly connected with the base plate 172a.

Figure 7:
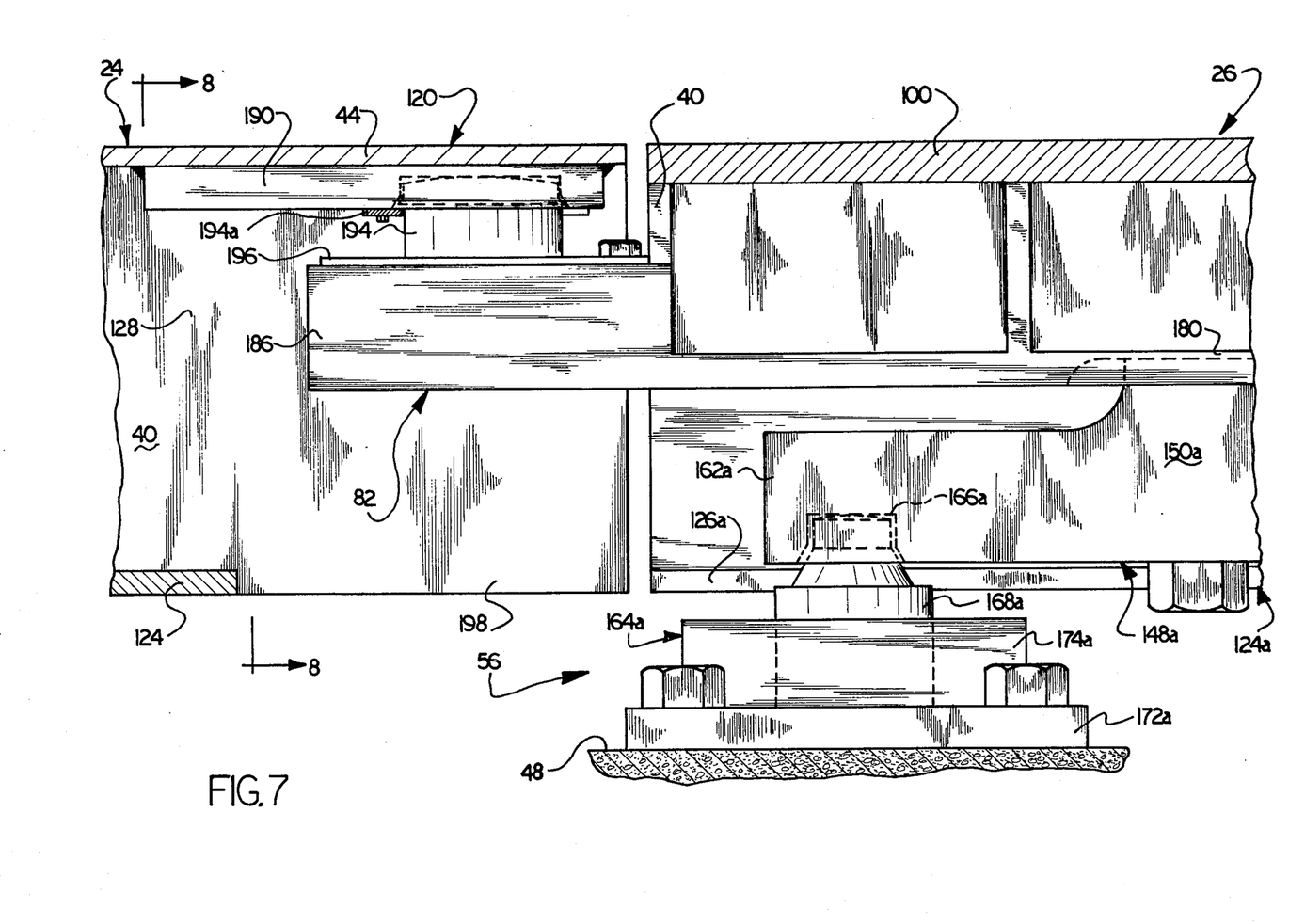
FIG. 7 is an elevational view, taken on an enlarged scale along the line 7—7 of FIG. 2, illustrating the manner in which a support arm on one platform engages the next adjacent platform and illustrating the relationship of a load responsive weighing unit to the support arm.

The support arm 82 extends from the support section 40 of the platform 26 into the support section 40 of the platform 24 in the manner illustrated in FIG. 7. The relationship between the support arm 82 and the support section 40 of the platform 24 is also illustrated in FIG. 8 which is taken along the line 8—8 of FIG. 7.

Figure 8:
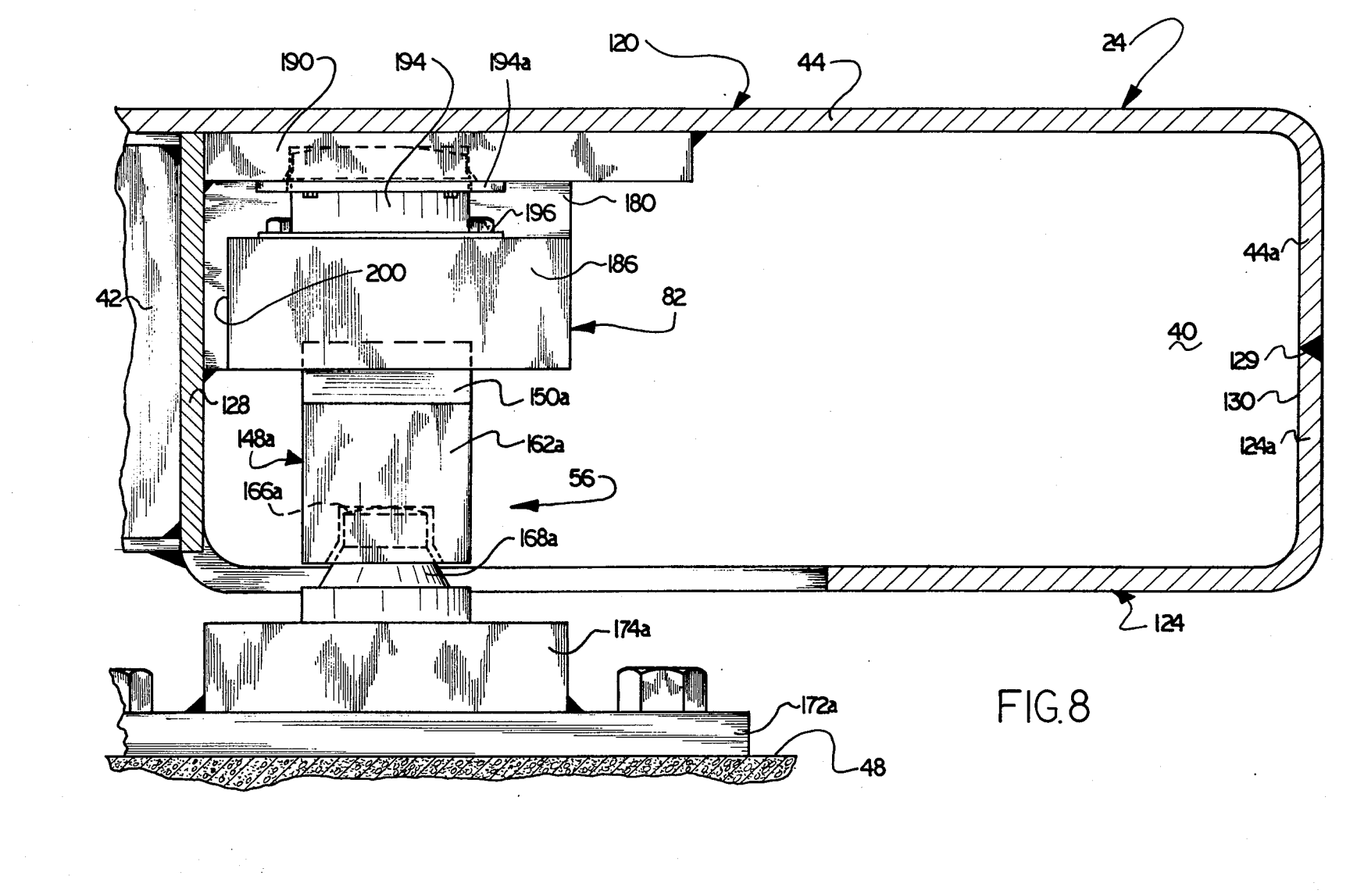
FIG. 8 is an elevational view, taken on an enlarged scale along the line 8—8 of FIG. 2 and the line 8—8 of FIG. 7, further illustrating the construction of the support arm and load responsive weighing unit.

The support arm 82 includes a rectangular support block 180 (FIGS. 7 and 8). The support block 180 is fixedly connected with the top and sidewalls of the support section 40 of the platform 26 in the same manner as in which the support block 142 is fixedly connected with the top and sidewalls 120 and 128 of the support section for the platform 24 (see FIG. 5).

The support arm 82 has a fixed end portion 180 and a free end portion 186 to which a load is applied by the platform 24 (FIGS. 7 and 8). Thus, the platform 24 has a load plate or pad 190 which is fixedly connected with the portion of the deck plate 44 which forms the top wall 120 of the support section 40. A cylindrical load pin 194 is received in a recess in the pad 190 and extends downwardly into engagement with a stainless steel shim 196 of the rectangular support arm 186.

The pin 194 has a spherical end which fits into a recess in plate 190. The pin 194 fits deep enough into plate 190 so that the sides of the pin 194 contact the sides of the recess in the plate 190 so that the pin 194 moves with plate 190 when horizontal movement occurs. The pin 194 has a flat portion which contacts the stainless steel shim 196. The flat portion of the pin 194 has Teflon material bonded to it, and the stainless steel shim 196 has a smooth surface. The coefficient of friction between these surfaces is relatively low, and therefore the surfaces can move relatively easily in respect to one another. Further, pin 194 is retained against the plate 190 to prevent it from falling out of contact wit the plate 190 in the event plate 190 is raised. The pin 194 has a flange portion which engages a U-shaped capture plate 194a which is suitably secured to the plate 190. A rectangular opening 198 in the bottom wall 124 of the support section 40 facilitates installation of the platform 24 on the support arm 82.

When a load is applied to the platform 24, a portion of the load is carried by the weighing units 52 and 54 at the left end of the platform (as viewed in FIG. 2). In addition, a portion of the load is carried by the support arm 82 at the lower right end of the platform (as viewed in FIG. 2). Since the support arm 82 is a cantilevered extension of the platform 26, the load which is applied by the platform 24 to the support arm 82 is transmitted to the platform 26 and the weighing unit 56.

In order to minimize the application of twisting or torsional forces to the weighing unit 56, the support arm 82 is disposed in vertical alignment with the load arm 148a of the weighing unit 56 (see FIGS. 7 and 8). It should be noted that the support arm 82 has a horizontal longitudinal central axis which extends parallel to and is disposed directly above a horizontal longitudinal central axis of the load arm 148a. By positioning the load arm 148a directly beneath the support arm 82, a compact construction of the weighing apparatus 20 is promoted and the load arm 148a and the support arm 82 are protected by the support sections 40 of the two platforms 24 and 26.

In order to prevent excessive sidewise movement of the platform 24 relative to the platform 26, the support arm 82 has a longitudinally extending rectangular side surface 200 which extends parallel to and is spaced a short distance from the inner sidewall 128 (see FIG. 8) of the support section 40 for the platform 24. If the platform 24 should tend to shift toward the right (as viewed in FIG. 8), the inner sidewall 128 will move into abutting engagement with the side surface 200 of the support arm 82 to limit the sideward movement of the platform 24 relative to the platform 26. It should be noted that the support arm 82 is itself held against sidewise movement relative to the support surface 48 by the weighing unit 56.

If the platform 24 is subjected to a load tending to shift the platform toward the left (as viewed in FIG. 8), the support arm 84 (FIG. 2) will limit the sideward movement of the platform 24. The support arm 84 is connected with the platform 26 in the same manner as is the support arm 82. The support arm 84 is vertically aligned with a load arm for the weighing unit 58 (FIG.

2) in the same manner as in which the support arm 82 is vertically aligned with the load arm 148a for the weighing unit 56.

The weighing unit 58 is constructed somewhat differently from the weighing unit 56 in that the weighing unit 58 is not fixedly connected with the support surface 48. Therefore, the weighing unit 58 is a floating or movable unit which can shift through a limited distance to accommodate thermal expansion of the platforms 24 and 26. It should be noted that although the weighing unit 58 is free to shift through a limited distance, the weighing unit 56 anchors the platform 26 to the support surface 48 to prevent excessive sidewise shifting movement of the platform 26.

The support arms 86 and 88 (FIG. 2) extend from the support sections 38 and 40 of the platform 28 into the support sections of the platform 26 to support one end portion of the platform 26 and to hold the platform against excessive sidewise movement in the same way as previously explained in connection with the support arms 82 and 84. Similarly, the support arms 90 and 92 extend from the support sections 38 and 40 of the platform 30 into the support sections for the platform 28 and support the right (as viewed in FIG. 2) end of the platform 28 in the same manner as in which the right (as viewed in FIG. 2) end of the platform 24 is supported by the arms 82 and 84.

The weighing units 60 and 64 (FIG. 2) are fixedly connected with the support surface 48 in the same manner as the weighing units 52 and 56. Similarly, the weighing units 62 and 66 are free to shift relative to the support surface 48 in the same manner as are the weighing units 54 and 58. This enables the platforms 24, 26, 28 and 30 to move sidewise through a limited distance to accommodate thermal expansion and to allow limited twisting movement of each of the platforms about their respective fixed weighing units 52, 56, 60 and 64.

The right end of the platform 30 is diposed adjacent to the exit ramp 34. The exit ramp 34 does not have support arms, similar to the arms 82 and 84, to support the right end of the platform 30. Therefore, the right end of the platform 30 is supported by a pair of weighing units 68 and 70. The manner in which the weighing unit 68 cooperates with the right end of the weighing platform 30 is shown in FIG. 9.

The weighing unit 68 includes a load arm 210 which has the same construction as the load arm 148 of FIGS. 4 and 5. Thus, the cantilevered load arm 210 (FIG. 9) has a free end portion 212 which engages a base assembly 214. In addition, the load arm 210 has a fixed end portion 218 which is bolted to a support block 220 connected with the sidewall 222 and top wall 224 of the support section 40 of the platform 30. The manner is which the weighing unit 68 is connected with the support block 220 is the same as in which the weighing unit 52 is connected with the support block 142 (see FIGS. 4 and 5).

Figure 9:
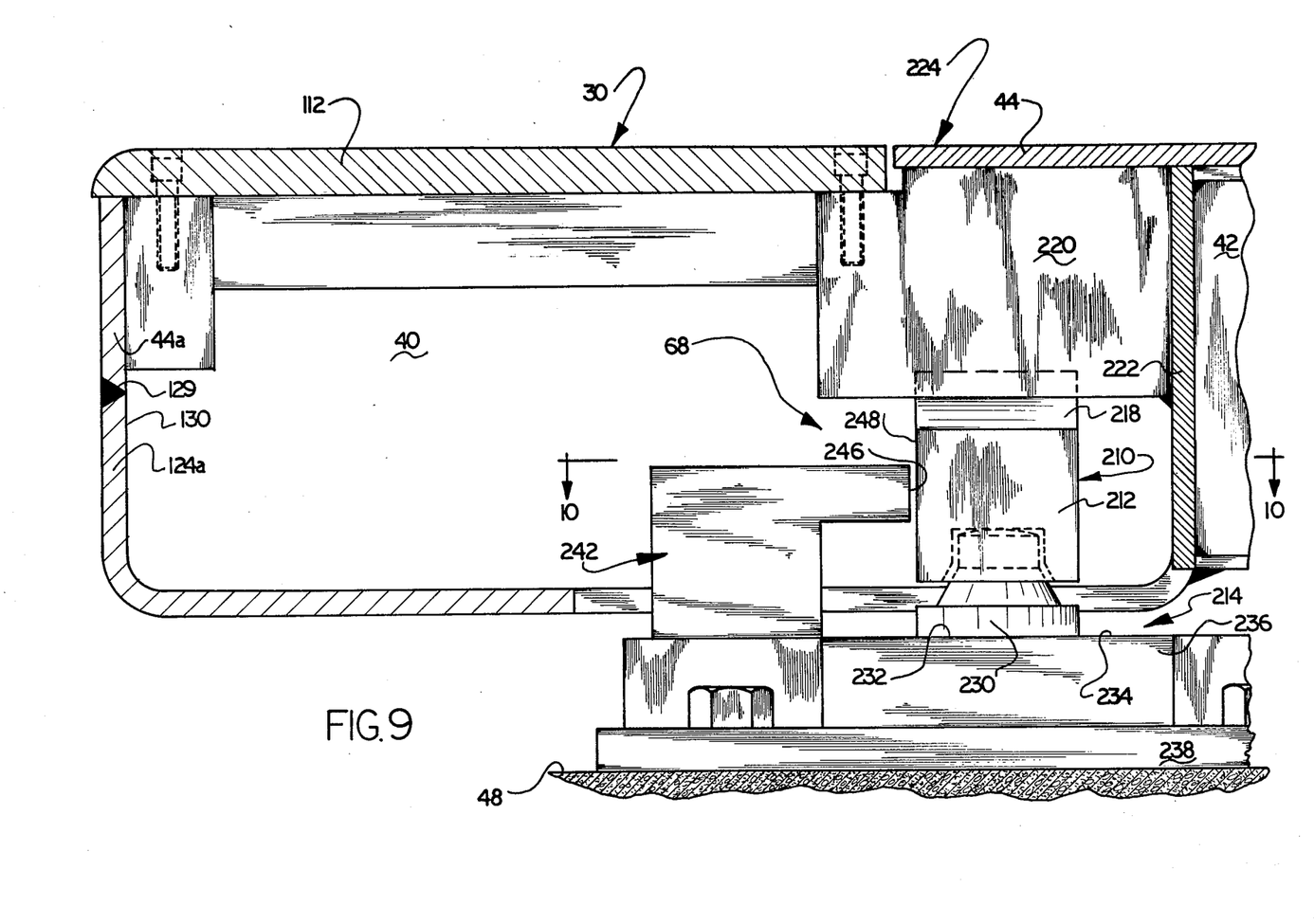
FIG. 9 is an enlarged sectional view, taken generally along the line 9—9 of FIG. 2 and illustrating the relationship between a support arm and a load responsive weighing unit having a bumper block to limit sidewise movement of the support arm and weighing unit.

The principal difference between the weighing unit 68 of FIG. 9 and the weighing unit 52 of FIGS. 4 and 5 is that a load pin 230 of the weighing unit 68 is free to shift through a limited distance relative to the support surface 48. The load pin 230 has an axial extent which is shorter than the axial extent of the load pin 168 of FIGS. 4 and 5 and has a bottom surface 232 which is disposed in abutting sliding engagement with a top surface 234 of a base plate 236. The base plate 236 is fixedly connected to a bottom plate 238 which is in turn fixedly connected with the support surface 48 (see FIGS. 9 and 10).

The load pin 230 is free to slide in any direction along the upper surface 234 of the plate 236. Sidewise movement in a leftward direction (as viewed in FIG. 9) is limited by a bumper block 242 which is fixedly connected with the base plate 236. The bumper block 242 has a side surface 246 (see FIGS. 9 and 10) which is positioned a relatively small distance from a vertical side surface 248 of the load arm 210. Upon shifting movement of the platform 230 toward the left (as viewed in FIGS. 9 and 10), the surface 248 moves into abutting engagement with the surface 246 on the bumper block 242 to limit the sideward movement of the platform 30.

Figure 10:
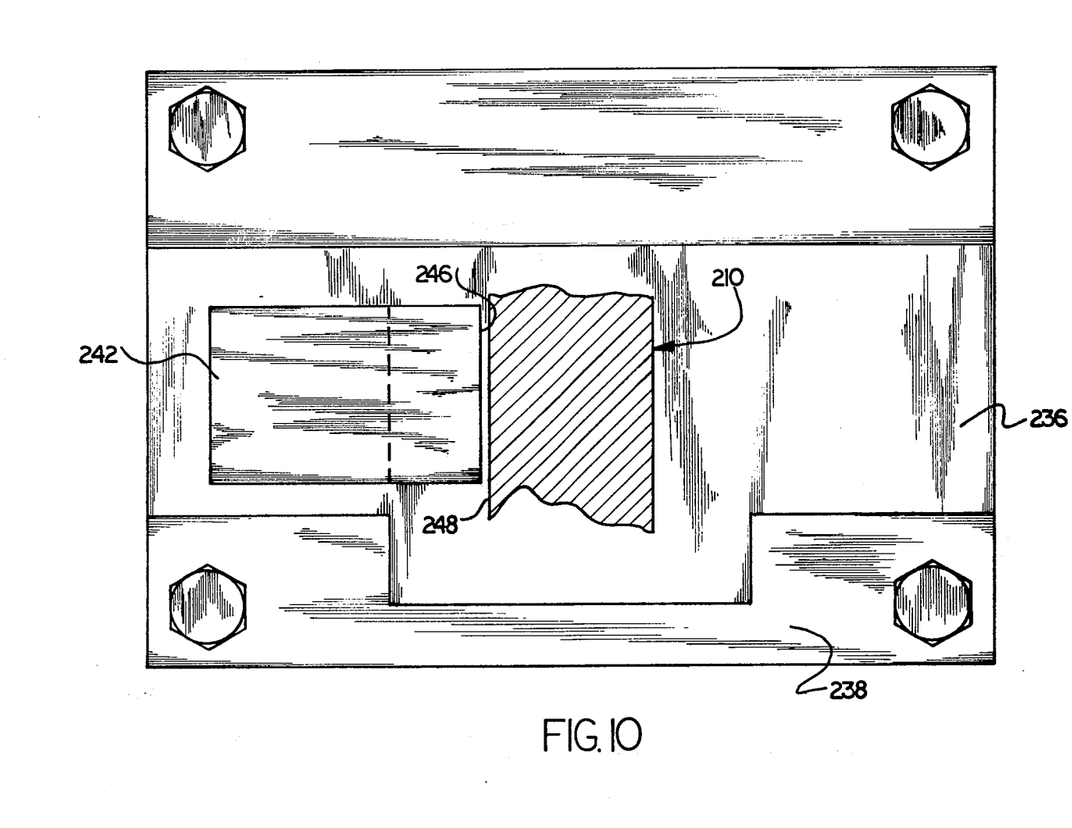
FIG. 10 is a sectional view, taken generally along the line 10—10 of FIG. 9 and further illustrating the relationship between the bumper block and weighing unit.

Although only the bumper block 242 which is associated with the weighing unit 68 has been shown in FIGS. 9 and 10, a similar bumper block is associated with the weighing unit 70 to limit upward (as viewed in FIG. 2) movement of the platform 30. Thus, the fixed load pin 168a of the weighing unit 64 (see FIG. 6) provides a pivot point about which the platform 30 can move. The bumper blocks associated with the weighing units 68 and 70 limit the sideward pivoting movement of the platform 30 to a distance which will accommodate thermal expansion of the platform without allowing excessive sidewise movement.

Although the construction of the support section 40 has more fully illustrated in the drawings than the construction of the support section 38, it should be understood that the support section 38 has the same construction as the support section 40 with the exception that it is disposed on the other side of the platform and therefore is of the opposite hand. It should also be understood that although only the movable load pin 230 for the weighing unit 68 has been illustrated in the drawings, the weighing units 54, 58, 62, 66 and 70 have movable load pins with a construction similar to the construction of the load pin 230 of FIG. 9 and which are movable on a support plate in the same manner as in which the load pin 230 is movable along the support plate 236. However, it should be understood that bumper blocks, similar to the bumper block 242 of FIG. 9, are associated with only the weighing units 68 and 70. This is because excessive sidewise movement of the load pins for the weighing units 54, 58, and 62 is prevented by the interaction between the support arms 82-92 and the platforms 24, 26 and 28.

In view of the foregoing description it is apparent that the present invention provides a new and improved weighing apparatus 20 having relatively compact load receiving platforms 24-30 which are strong, light weight and inexpensive to fabricate. The weighing apparatus 20 is formed by separate platforms 24-30 so that the apparatus can be readily assembled at a weighing site. In addition, the apparatus 20 can be readily disassembled and transported to another weighing site if desired.

Each platform 24-30 includes a pair of box or tubular support sections 38 and 40 which are disposed along longitudinally extending edge portions of the platform. The support sections 38 and 40 are interconnected by a plurality of cross beams 42. A deck plate 44 spans the space between the support sections 38 and 40 and the cross beams 42. Load responsive weighing units 52-70 are disposed within the support sections 38 and 40 of the platforms where they are protected from the surrounding environment.

In accordance with one of the features of the present invention, a plurality of platforms 24–30 are interconnected to transmit a load between them in such a manner as to minimize the number of load responsive weighing units which are required for the platforms. Thus, a pair of spaced apart support arms 82 and 84 project outwardly from the support sections 38 and 40 of one platform 26 into the support sections 38 and 40 of a next adjacent platform 24 to partially support the next adjacent platform. In addition to partially supporting the next adjacent platform, the support arms hold the adjacent platform against excessive sidewise movement.

In order to promote an accurate reading by a load responsive weighing unit 56, 58, 60, 62, 64, or 66 which is associated with a support arm, the weighing unit 56, for example, includes a load arm 148a which is disposed directly beneath and in vertical alignment with the support arm 82. One end 150a of the load arm 148a is fixedly connected with the support arm 82. A free end 162a of the load arm 148a is disposed below the support arm 82 and engages a base arrangement 164a which transmits a load through an opening in the bottom wall of a support section 40 to a suitable support surface. This mounting arrangment for the weighing unit 56 tends to minimize the application of torsion loading to a load arm and enables the unit to be protected from the surrounding environment by the support section 40 of the platform 26.

Having described one specific preferred embodiment of the invention, the following is claimed:

1. A weighing apparatus adapted to be disposed on a support surface, said weighing apparatus comprising a longitudinally extending platform, said platform including a pair of parallel box support sections which are disposed along longitudinally extending edge portions of said platform and extend throughout the length of said platform, each of said box support sections including a pair of spaced apart longitudinally extending sidewalls, a bottom wall extending between said sidewalls, and a top wall interconnecting said sidewalls and extending parallel to said bottom wall, each of said box support sections having an opening in its bottom wall adjacent to an end of the box support section, a plurality of beams extending between said box support sections, each of said beams having a longitudinal central axis which extends transversely to the longitudinal central axes of said box support sections, and plate means for spanning the space between said box support sections and said beams, and a plurality of load responsive units each of which is mounted in one of said box support sections and extends through an opening in the bottom wall of said one box support section to transmit a load to the support surface.

2. A weighing apparatus as set forth in claim 1 wherein said top wall of each of said box support sections includes an opening to provide access to one of said load responsive units and a removable closure plate for blocking the top wall opening.

3. A weighing apparatus as set forth in claim 1 wherein said sidewalls of each of said box support sections include an outer sidewall extending along an outer edge of said platform and an inner sidewall disposed inwardly from the outer sidewall, each of said load responsive units being disposed adjacent to one of said inner sidewalls.

4. An apparatus as set forth in claim 3 wherein each of said beams has end portions fixedly connected with the inner side walls of said box support sections.

5. A weighing apparatus as set forth in claim 3 wherein the opening in the bottom wall of each of said box support sections extends outwardly from a location adjacent to the inner sidewall across a portion of the bottom wall to a location which is spaced from the outer sidewall of said box support section.

6. A weighing apparatus as set forth in claim 5 wherein said top wall of each of said box support sections includes an opening which extends inwardly from a location adjacent to the outer sidewall across a portion of the bottom to a location which is spaced from the inner sidewall of said box support section and overlaps the opening in the bottom wall of said box support section, said top wall of each of said box sections further including a removable closure plate for blocking the top wall opening.

7. A weighing apparatus adapted to be disposed on a support surface, said weighing apparatus comprising a platform assembly adapted to receive a load, said platform assembly including a plurality of platform sections disposed in a linear array with an end portion of one platform section adjacent to an end portion of a next adjacent platform section, each of said platform sections including a pair of spaced apart box support sections which are disposed along longitudinally extending edge portions of the platform section, extend throughout the length of the platform section, and have longitudinal central axes which extend parallel to the longitudinal central axis of the linear array of platform sections, each of said platform sections further including a plurality of beams extending between said box support sections and plate means for spanning the space between said box support sections and said beams, a pair of spaced apart support arms connected with said one platform section, each of said support arms being connected with and projecting outwardly from a box support section of said one platform section into a box support section of said next platform section to partially support said next platform section, said box support sections of said next platform section and said support arms being movable relative to each other to enable relative movement to occur between said one platform section and said next platform section, and a plurality of load responsive units each of which is adapted to engage the support surface and is connected with one of the box support sections of said one platform section and one of said support arms to transmit a load applied to the box support section of one platform section and a load applied to the one support arm by said next platform section to the support surface.

8. An apparatus as set forth in claim 7 wherein each of said box support sections includes a pair of spaced apart longitudinally extending sidewalls, a bottom wall extending between said sidewalls, and a top wall interconnecting said sidewalls, each of said box support sections of said one platform section having an opening in its bottom wall through which one of said load responsive units extends.

9. A weighing apparatus as set forth in claim 7 wherein each of said support arms has side surface means for engaging a box support section of said next platform section to limit sidewise movement between said one platform section and said next platform section.

10. An apparatus as set forth in claim 7 wherein each of said box support sections of said one platform section includes inner and outer sidewalls which extend parallel to the longitudinal central axis of the array of platform sections, said inner sidewalls being disposed closer to the longitudinal central axis of the array of platform sections than said outer sidewalls, said support arms and said load responsive units being disposed adjacent to said inner sidewalls of said box support sections of said one platform section.

11. An apparatus as set forth in claim 7 wherein each of said box support sections of said next platform section includes a top wall which transmits a load to one of said support arms.

12. An apparatus as set forth in claim 7 wherein one of said load responsive units is fixedly connected with said support surface and another of said load responsive units is movable relative to said support surface and said one load responsive unit.

13. An apparatus as set forth in claim 7 wherein each of said load responsive units includes a load arm having a first end portion which is fixedly connected to an end portion of one of said support arms and a second end portion which is free to deflect upwardly relative to said first end portion, each of said load responsive units further including a base which is disposed between the second end portion of said load arm and the support surface to transmit a load from the second end portion of said load arm to the support surface.

14. An apparatus as set forth in claim 13 wherein each of said load arms is disposed beneath and extends parallel to one of said support arms.

15. A weighing apparatus adapted to be disposed on a support surface, said weighing apparatus comprising first and second platform sections, a plurality of support arms, each of said support arms having a first end portion which is fixedly connected with said first platform section and a free end portion which projects outwardly from said first platform section and is engaged by said second platform section to partially support said second platform section, and a plurality of load responsive units each of which is adapted to engage the support surface to transmit a load to the support surface, each of said load responsive units including a load arm and a base, said load arm having a first end portion which is fixedly connected to the first end portion of one of said support arms and a second end portion which is free to move relative to said first and second platform sections, said base being disposed in engagement with the second end portion of said load arm and the support surface to effect deflection of said load arm under the influence of a load applied to said first end portion of said load arm by said first end portion of said one support arm.

16. An apparatus as set forth in claim 15 wherein said load arm is disposed directly beneath said one support arm.

17. An apparatus as set forth in claim 15 wherein said load arm is shorter than said one support arm, said second end portion of said load arm being disposed beneath said first platform section.

18. An apparatus as set forth in claim 15 wherein said first and second platform sections each include a pair of spaced apart and parallel box support sections which are disposed along longitudinally extending edge portions of a platform section, each of said platform sections further including a plurality of beams extending between said box support sections and plate means for spanning the space between said box support sections and said beams, each of said support arms extending outwardly from a box support section of said first platform section into a box support section of said second platform section.

* * * * *